(12) United States Patent
Smith et al.

(10) Patent No.: US 11,170,749 B2
(45) Date of Patent: Nov. 9, 2021

(54) ELECTRONIC DEVICE HOLDER WITH SOUND DIRECTING CAPABILITIES

(71) Applicant: Garett P. Smith, Fargo, ND (US)

(72) Inventors: Garett P. Smith, Fargo, ND (US); Guy Patrick Nelson, Fargo, ND (US)

(73) Assignee: Garett P. Smith, Fargo, ND (US)

( * ) Notice: Subject to any disclaimer, the term of this patent is extended or adjusted under 35 U.S.C. 154(b) by 700 days.

(21) Appl. No.: 16/015,589

(22) Filed: Jun. 22, 2018

(65) Prior Publication Data

US 2019/0005936 A1 Jan. 3, 2019

Related U.S. Application Data

(60) Provisional application No. 62/527,110, filed on Jun. 30, 2017.

(51) Int. Cl.
  *G10K 11/08* (2006.01)
  *G10K 11/02* (2006.01)
  (Continued)

(52) U.S. Cl.
  CPC .......... *G10K 11/025* (2013.01); *G10K 11/26* (2013.01); *H04M 1/04* (2013.01); *H04M 1/035* (2013.01)

(58) Field of Classification Search
  CPC ........ G10K 11/18; G10K 11/28; G10K 11/02; G10K 11/025; G10K 11/08; G10K 11/26; H04M 1/04; H04M 1/035; H04M 1/215; H04M 1/2155; H04M 1/6066; H04M 1/6041; H04R 1/02; B60N 3/10; B60R 11/02; B60R 11/0241
  See application file for complete search history.

(56) References Cited

U.S. PATENT DOCUMENTS 1,246,317 A * 11/1917 Porter ................ H04M 1/2155
                                                           379/444
D397,915 S * 9/1998 McNaughton ............. D7/619.1
(Continued)

FOREIGN PATENT DOCUMENTS

| GB | 2439985 A | 1/2008 |
|---|---|---|
| KR | 101164015 B1 | 7/2012 |
| KR | 20140029899 A | 3/2014 |

OTHER PUBLICATIONS

International Patent Application No. PCT/US2018/040493, International Search Report and Written Opinion dated Sep. 12, 2018, 14 pages.

*Primary Examiner* — Edgardo San Martin
(74) *Attorney, Agent, or Firm* — Fredrikson & Byron, P.A.

(57) ABSTRACT

An electronic device holder may include a body portion housed within an outer housing. The body portion may include surfaces that form a first cavity configured to receive the electronic device, and a second cavity. A sound transmitting passage can be positioned between the first cavity and the second cavity. The second cavity can passively amplify sound received from the second sound channel of the sound transmitting passage. The body of the electronic device holder can include a first wall, a first partition wall, and a second partition wall. The second wall can be generally parallel to a generally planar bottom surface of the holder and can be positioned between the first wall and the first partition wall so as to define a first cavity. A second cavity can be defined between the second partition wall and the outer housing.

20 Claims, 10 Drawing Sheets

(51) Int. Cl.
*H04M 1/215* (2006.01)
*H04M 1/04* (2006.01)
*G10K 11/26* (2006.01)
*H04M 1/03* (2006.01)

(56) References Cited

U.S. PATENT DOCUMENTS

| | | | | |
|---|---|---|---|---|
| 6,189,755 | B1 * | 2/2001 | Wakefield | B60N 3/108 |
| | | | | 224/542 |
| D524,807 | S * | 7/2006 | Topinka | D14/253 |
| 7,099,467 | B1 * | 8/2006 | Rohrbach | G09B 15/00 |
| | | | | 379/441 |
| 8,256,568 | B2 * | 9/2012 | Lin | H04M 1/04 |
| | | | | 181/179 |
| 8,522,917 | B1 * | 9/2013 | Oh | G10K 11/08 |
| | | | | 181/192 |
| 8,634,883 | B2 * | 1/2014 | Hong | H04M 1/04 |
| | | | | 455/575.1 |
| 9,084,041 | B2 * | 7/2015 | Tsai | H04R 1/02 |
| 9,117,435 | B2 * | 8/2015 | Huang | G10K 11/08 |
| 9,241,055 | B1 | 1/2016 | Barker | |
| 9,628,597 | B1 * | 4/2017 | Andersen | G06F 13/4081 |
| 10,051,361 | B2 * | 8/2018 | Morin | H04R 1/34 |
| 10,348,351 | B2 * | 7/2019 | Rivera | H04M 1/04 |
| 2003/0148740 | A1 * | 8/2003 | Yau | H04M 1/04 |
| | | | | 455/575.1 |
| 2005/0255895 | A1 * | 11/2005 | Lee | G06F 1/1632 |
| | | | | 455/573 |
| 2011/0170725 | A1 * | 7/2011 | Liu | H04R 1/02 |
| | | | | 381/338 |
| 2014/0056443 | A1 * | 2/2014 | Yui | H04R 1/02 |
| | | | | 381/120 |

\* cited by examiner

ELECTRONIC DEVICE HOLDER WITH SOUND DIRECTING CAPABILITIES

RELATED APPLICATIONS

This application claims the benefit of U.S. Provisional Patent Application No. 62/527,110, filed Jun. 30, 2017, the entire contents of which are incorporated herein by reference.

BACKGROUND

Electronic devices such as cellular phones, music players, portable radios, and the like may generate sound. Such sound may be audible or inaudible.

SUMMARY

In an aspect, this disclosure is directed to an electronic device holder with sound directing capabilities, with the holder being configured to receive at least a portion of the electronic device. The holder may define a first cavity for receiving a portion of the electronic device, a cord passage being in communication with the first cavity and being configured to align with an electrical connection interface of the electronic device when the electronic device is positioned in the first cavity, and a first sound channel being in communication with the first cavity and being configured to align with a sound emanation structure of the electronic device when the electronic device is positioned in the first cavity. The holder may further define a second cavity configured to convey sound emanating from an electronic device positioned in the first cavity, a second sound channel in communication with the second cavity, and a sound transmitting passage in communication with the first cavity and a second cavity. The sound transmitting passage may extend from the a first sound channel of the first cavity to the second sound channel of the second cavity first cavity.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

Certain aspects of the disclosure include an electronic device holder for holding an electronic device. The electronic device holder may include a body portion housed within an outer housing. The body portion may include surfaces that form a first cavity configured to receive the electronic device, and a second cavity. A sound transmitting passage can be positioned between the first cavity and the second cavity. The sound transmitting passage can have a first sound channel positioned on the second wall, whereby, when the electronic device is positioned in the first cavity, at least one of the one or more speakers of the electronic device can be aligned with the sound transmitting passage. The sound transmitting passage can have a second sound channel positioned on the second partition wall, such that sound from the one or more speakers of the electronic device is conveyed via the second sound channel to the second cavity. The sound transmitting passage can have a curved channel that connects the first sound channel and the second sound channel and positioned therebetween. The second cavity can passively amplify sound received from the second sound channel of the sound transmitting passage.

In some aspects, a cross-sectional area of the second cavity can along a direction parallel to the longitudinal center axis to passively amplify sound generated by the electronic device.

In still further aspects, the body of the electronic device holder can include a first wall, a first partition wall, and a second partition wall. The second wall can be generally parallel to a generally planar bottom surface of the holder and can be positioned between the first wall and the first partition wall so as to define a first cavity. A second cavity can be defined between the second partition wall and the outer housing.

Embodiments of the present disclosure also include the following numbered embodiments:

1. An electronic device holder for holding an electronic device, the electronic device comprising one or more speakers for transmitting sound generated by the electronic device, the electronic device holder being housed within an outer housing and/or resting on a support surface, the electronic device holder comprising: a body portion having a first wall, a second wall, a first partition wall and a second partition wall,
   each of the first wall, the first partition wall, and the second partition wall being generally perpendicular to the support surface, the second wall being generally parallel to the support surface and positioned between the first wall and the first partition wall so as to define a first cavity,
   a second cavity defined between the second partition wall and the outer housing, and a sound transmitting passage in communication with the first cavity, the sound transmitting passage having a first sound channel and a second sound channel,
   the first cavity configured to receive the electronic device such that the one or more speakers of the electronic device are aligned with the sound transmitting passage, such that sound emitted by the electronic device is conveyed and/or amplified via the sound transmitting passage.
2. The electronic device holder of embodiment 1, further comprising a longitudinal center axis, the longitudinal center axis being generally perpendicular to each of the generally planar bottom surface and the second wall.
3. The electronic device holder of embodiment 2, wherein the sound transmitting passage has a first portion oriented in a direction generally parallel to the longitudinal center axis, and a second portion extending in a direction perpendicular to the longitudinal center axis.

4. The electronic device holder of embodiment 3 or any previous embodiment, wherein the second portion is formed by at least one curved surface.
5. The electronic device holder of embodiment 1 or any previous embodiment, wherein the first sound channel is located such that when the electronic device is held in the first cavity, the first sound channel is inline with at least one of the one or more speakers of the electronic device.
6. The electronic device of embodiment 1 or any previous embodiment, wherein the body portion is removably coupled to the outer housing.
7. The electronic device of embodiment 1 or any previous embodiment, wherein the second wall has a cord passage configured to align with an electrical connection interface of the electronic device when the electronic device is received in the first cavity.
8. The electronic device of embodiment 7 or any previous embodiment, wherein the electronic device holder has a generally planar bottom surface having a second slot at least partially in line with the cord passage of the second wall, the second slot permitting passage of an electrical connector therethrough to be connected to the electrical connection interface of the electronic device, thereby permitting electrical connection to the electronic device when the electronic device is housed within the first cavity.
9. The electronic device of embodiment 1 or any previous embodiment, wherein the first wall includes a cutout terminating in an access notch, the access notch being located such that when the electronic device is received in the first cavity, the access notch is aligned with an actuation button of the electronic device.
10. An electronic device holder for holding an electronic device, the electronic device comprising one or more speakers for transmitting sound generated by the electronic device, the electronic device holder comprising:
an outer housing having a generally planar bottom surface, the generally planar bottom surface configured to rest on a support surface, the outer housing having a curved interior surface; and
a body portion housed within the outer housing, the body portion having a first wall, a second wall, a first partition wall and a second partition wall,
the first partition wall and the second partition wall being opposite to each other, the second partition wall being generally perpendicular to a longitudinal center axis of the electronic device holder,
the first wall, the first partition wall, and the second wall defining a first cavity for receiving the electronic device,
the second partition wall and the curved interior surface defining a second cavity,
the second cavity having a first sound channel and a second sound channel, the first sound channel of the second cavity being in communication with the first cavity via a sound transmitting passage, the first sound channel of the second cavity being proximal to the generally planar bottom surface, the second sound channel of the second cavity being oppositely oriented to the first sound channel,
a cross-sectional area of the second cavity increasing along a direction parallel to the longitudinal center axis to passively amplify sound generated by the electronic device.
11. The electronic device holder of embodiment 10 or any previous embodiment, wherein the body portion comprises a third wall, the third wall abutting the second partition wall at a first side and a second side, the first side being opposite to the second side.
12. The electronic device holder of embodiment 11 or any previous embodiment, wherein the third wall is curved at least proximal to the first side and the second side.
13. The electronic device holder of embodiment 12 or any previous embodiment, wherein the third wall includes a cutout portion, whereby the second cavity is enclosed by the second partition wall, the third wall and the curved interior surface.
14. The electronic device holder of embodiment 13 or any previous embodiment, wherein the second cavity has a generally frustoconical shape.
15. The electronic device holder of embodiment 10 or any previous embodiment, wherein the first cavity has a generally constant cross-sectional area along the longitudinal center axis.
16. The electronic device holder of embodiment 15 or any previous embodiment, wherein the first cavity has a generally rectangular cross-section.
17. An electronic device holder for holding an electronic device, the electronic device comprising one or more speakers for transmitting sound generated by the electronic device, the electronic device holder being housed within an outer housing and/or resting on a support surface, the electronic device holder comprising:
a body portion housed within the outer housing, the body portion having a first wall, a second wall, a first partition wall and a second partition wall,
the first wall, the second wall and the first partition wall defining a first cavity configured to receive the electronic device
the second partition wall and an interior surface of the outer housing defining a second cavity,
a sound transmitting passage positioned between the first cavity and the second cavity, the sound transmitting passage having:
a first sound channel positioned on the second wall, whereby, when the electronic device is positioned in the first cavity, at least one of the one or more speakers of the electronic device being aligned with the sound transmitting passage,
a second sound channel positioned on the second partition wall, such that sound from the one or more speakers of the electronic device is conveyed via the second sound channel to the second cavity, and
a curved channel connecting the first sound channel and the second sound channel and positioned therebetween, the second cavity configured to passively amplify sound received from the second sound channel of the sound transmitting passage.
18. The electronic device holder of embodiment 17 or any previous embodiment, wherein the sound transmitting passage
has a first portion oriented in a direction generally parallel to a longitudinal center axis of the electronic device holder, the first portion terminating in the first sound channel and extending between the second wall and the curved channel.
19. The electronic device holder of embodiment 18 or any previous embodiment, wherein the sound transmitting passage has a second portion extending in a direction perpendicular to the longitudinal center axis, the second portion terminating in the second sound channel and extending between the curved channel and the second cavity.

20. The electronic device holder of embodiment 18 or any previous embodiment, wherein the sound transmitting passage is generally centered so as to be proximal to the longitudinal center axis and/or a transverse center axis of the electronic device holder, the transverse center axis being generally perpendicular to the longitudinal center axis.

The details of one or more examples are set forth in the accompanying drawings and the description below. Other features, objects, and advantages will be apparent from the description and drawings, and from the claims.

DETAILED DESCRIPTION

With reference now to the drawings, and in particular to FIGS. 1 through 9 thereof, a new electronic device holder 40 with sound directing capabilities embodying the principles and concepts of the disclosed subject matter will be described.

The storage of an electronic device 12, such as a cell phone or smartphone, in a vehicle can be difficult if it is desired to keep the device 12 close at hand for ready accessibility when exiting the vehicle while preventing the device 12 from moving around the interior of the vehicle during vehicle movement. Further, some device 12 holders may tend to muffle or even block the sound emanating from the device 12. Many if not most vehicles include one or more cup holders in locations that are readily accessible to the operator or the passenger but do not provide secure storage or display 30 of an electronic device 12. The disclosed embodiments address one or more of these technical problems.

The disclosed holder 40 for electronic device 12 that not only is capable of securely holding or supporting the device 12 in a cup holder of the vehicle to provide convenient viewing of a display 30 on the device 12 as well as ready manual access to the device 12 as well as its controls, but also serves to direct and even amplify sounds that emanate from the device 12 when it is being received in the holder 40.

The holder 40 is ideally utilized in the cup holder of a vehicle, but is not limited to that particular environment and may be utilized independent of a cup holder or even a vehicle. For instance, the holder 40 may be positioned on any support surface such as a desk or a table top, or even a floor.

Figure 1:
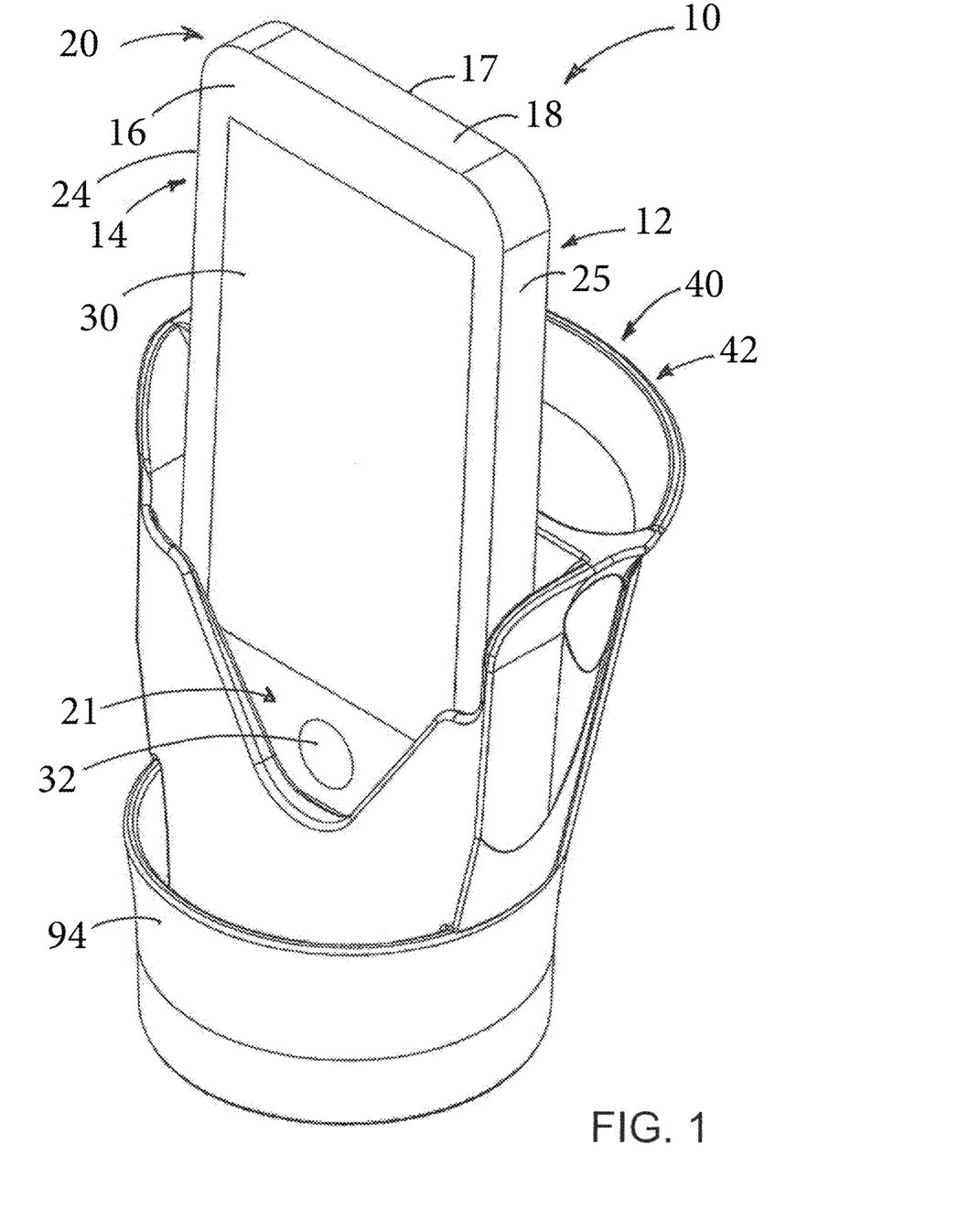
FIG. 1 is a schematic perspective view of an illustrative electronic device holder positioned in the new electronic device holder according to the present disclosure.
Figure 9:
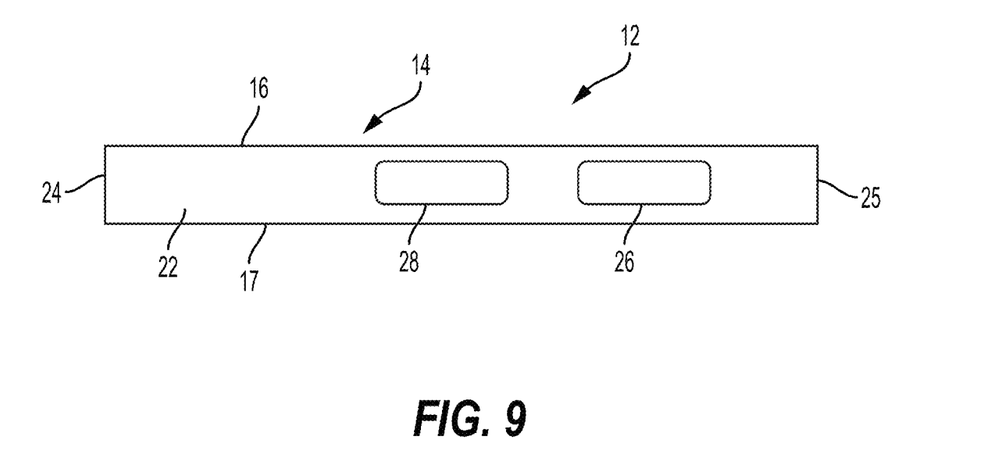
FIG. 9 is a schematic bottom view of an illustrative electronic device showing an electrical connection interface and a sound emanation structure on the case of the device.

In one aspect, referring to FIG. 1, a system 10 includes an electronic device 12 and an electronic device holder 40 either alone or in combination with the electronic device 12. FIGS. 1 and 9 illustrate one such electronic device 12 suitable for use with the device holder 40. The device 12 may include a sound emanation structure 26 through which sounds produced by the device 12 emanate. The electronic device 12 may comprise a communication device 12, such as a cellular telephone, and may have information handling capabilities or computing capabilities, a device 12 which is often referred to as a "smartphone." In additional or alternative embodiments, the electronic device 12 may include a wide variety of devices such as portable music players, portable radios, and any device 12 that may generate sound. The electronic device 12 may also be, in alternative embodiments, simply be a passive (non-electrically powered) device 12 that can generate sound.

With reference to FIGS. 1 and 9, the illustrative electronic device 12 may have a case 14 with a front surface 16, a rear surface 17, and a peripheral edge surface 18 which extends between the front 16 and rear 17 surfaces. In an embodiment, the front surface 16 and the rear surface 17 may be substantially planar and may be oriented substantially parallel to each other. The case 14 may be elongated with an upper end 20 and a lower and 21, and the peripheral edge surface 18 may have a bottom portion 22 which is located toward the lower end 21. The peripheral edge surface 18 may also have a pair of side edge portions 24, 25 and the bottom portion 22 may be located between the side edge portions on the peripheral edge surface 18.

With continued reference to FIGS. 1 and 9, the electronic device 12 may have a sound emanation structure 26 through which sound emanates or passes out of the case 14. In an example, the sound emanation structure 26 can include external speakers provided on the exterior of the electronic device 12. However, the sound emanation structure 26 can also include internal speakers positioned interior to the housing 86 of the electronic device 12. Still further, the electronic device 12 may include electrical circuitry (e.g., sound cards provided on processors of electronic devices 12), and may be provided within the electronic device 12.

The sound emanation structure 26 (e.g., speakers) may, in one embodiment, be formed on the case 14, such as toward the lower end 21 of the case 14. The sound emanation structure 26 may be positioned on the peripheral edge surface 18, such as on the bottom portion 22 of the peripheral edge surface 18. The electronic device 12 may also include an electrical connection interface 28 which is located on the case 14. In one exemplary embodiment, the electrical connection interface 28 is located toward the lower end 21 of the case 14 and often is located on the bottom portion 22 of the peripheral edge surface 18. The electrical connection interface 28 may be located substantially centrally on the bottom portion 22 between the side edge portions 24, 25 of the peripheral edge surface 18. In some embodiments, the sound emanation structure 26 may be located between the electrical connection interface 28 and one of the side edge portions of the peripheral edge surface 18 of the case 14.

Referring again to FIG. 1, the electronic device 12 may further include a display 30 which is positioned on the front surface 16 of the case 14, and may also include an actuation button 32 which is also located on the front surface 16 and may be located toward the lower end 21 of the case 14.

Figure 2:
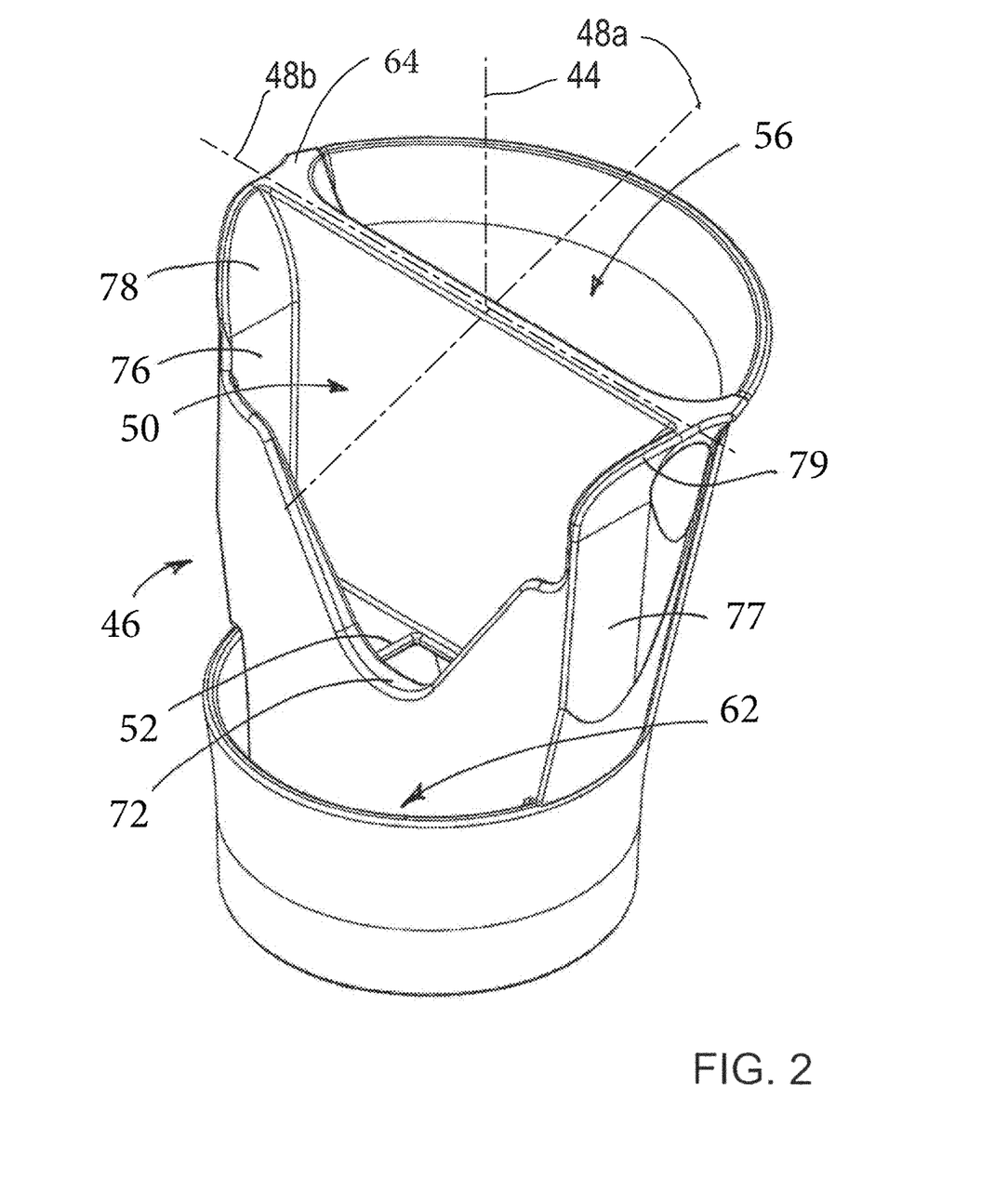
FIG. 2 is a schematic perspective view of the holder without the electronic device, according to an illustrative embodiment.
Figure 3:
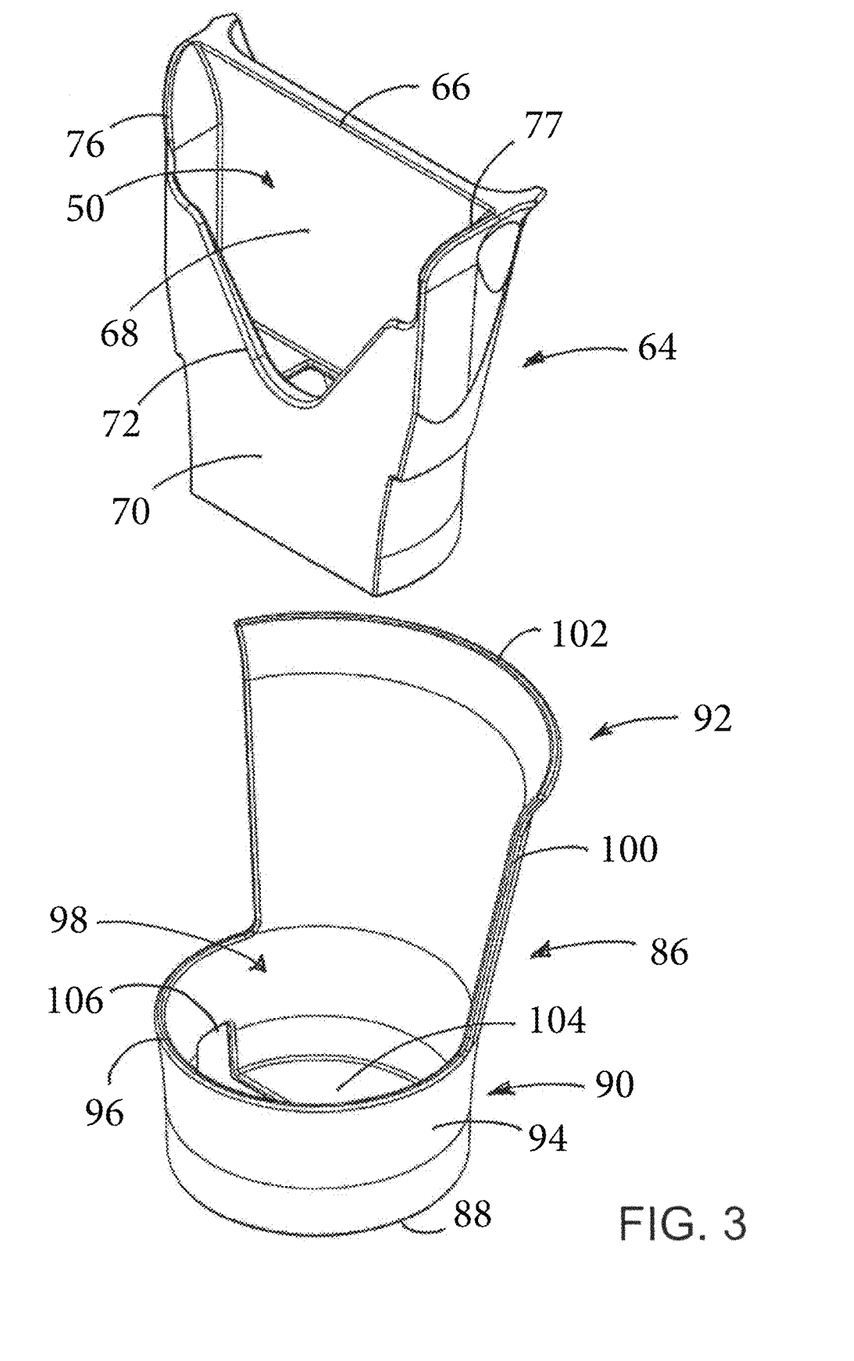
FIG. 3 is a schematic perspective exploded view of the holder, according to an illustrative embodiment.

Referencing FIGS. 2 and 3, the holder 40 may have a top 42 and a bottom 43, with a longitudinal center axis 44 extending between the top 42 and the bottom 43. The holder 40 may also have a front 46 and a rear 47, with a pair of transverse axes 48a, 48b. The holder 40 has a generally planar bottom surface 104 that can permit the holder 40 to rest against a support surface. The generally planar bottom surface 104 can also be of a shape and a size to be at least partially inserted into a cup holder of a vehicle, optionally with a significant portion of the holder 40 extending out of the cup holder. However, as mentioned previously, the holder 40 may be used independently of a cup holder, and may rest against any surface, such as a desk top or a floor surface. Accordingly, the holder 40 can have any shape or size that can maintain a stable orientation when the electronic device 12 is held in the holder 40, while advantageously providing sound amplification capabilities.

As seen in FIGS. 2 and 3, the holder 40 may include a body 64. In some embodiments, the body 64 can be rested against a support surface and support the device 12 and/or provide sound amplification. In some optional embodiments, the body 64 can be received within a cup (e.g., a drinking cup). Alternatively, the body 64 may be used as a standalone component resting on a support surface such as a desk top or a floor surface and receive the device 12 and/or provide sound amplification.

Figure 4:
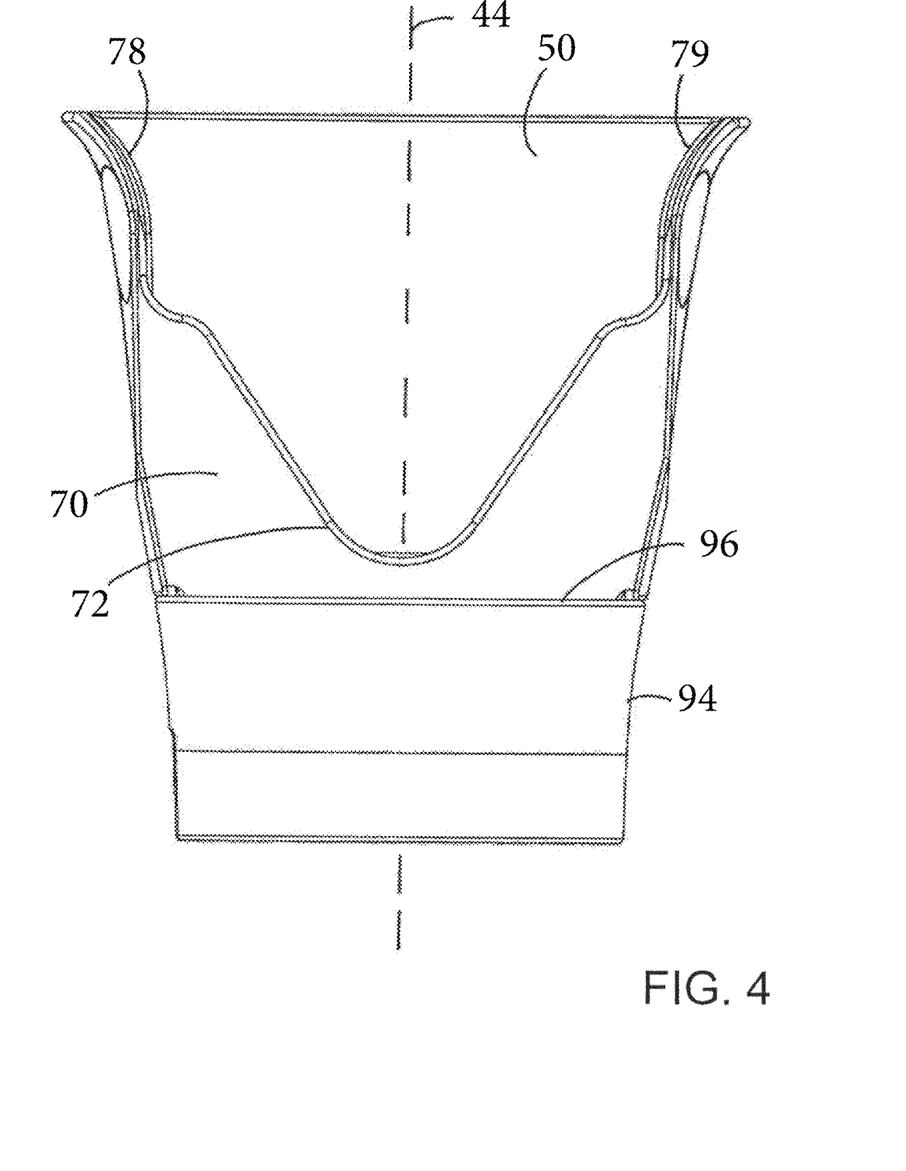
FIG. 4 is a schematic front view of the holder, according to an illustrative embodiment.
Figure 5:
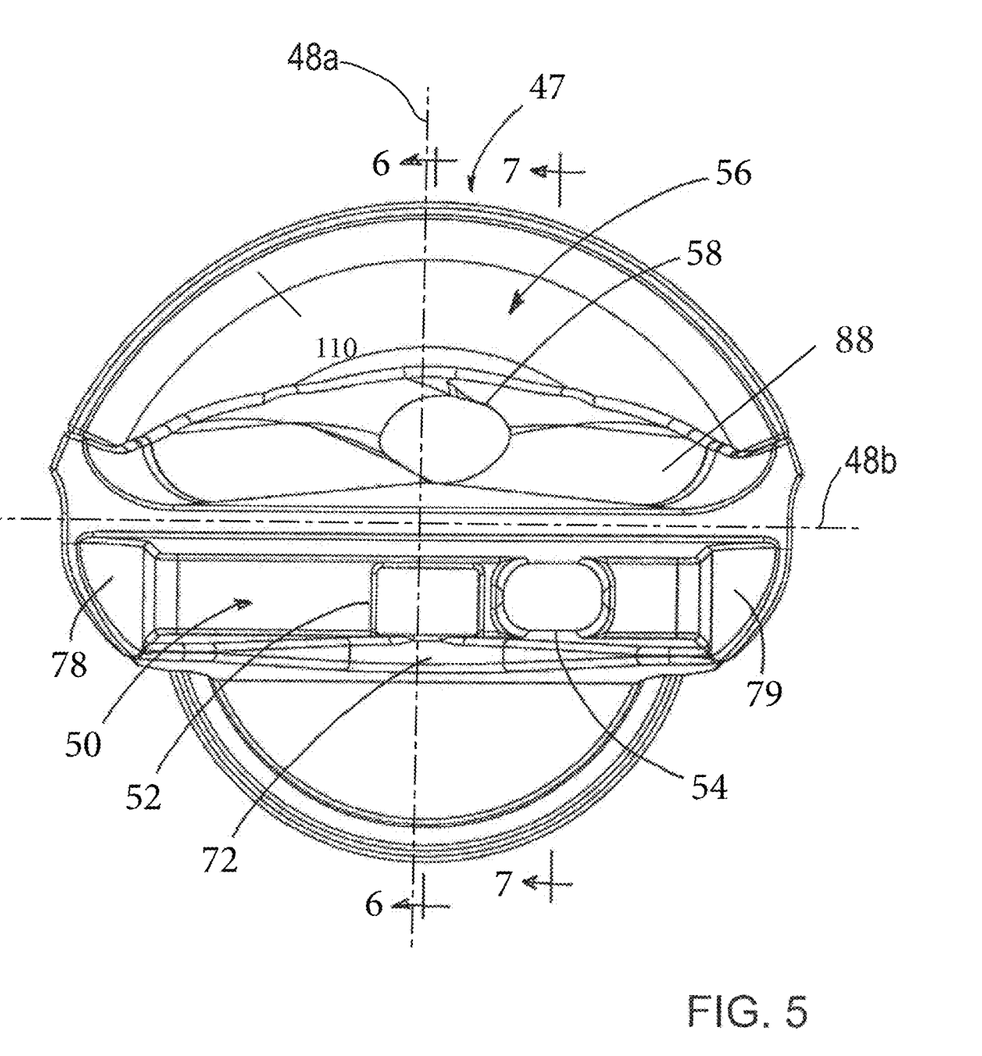
FIG. 5 is a schematic top view of the holder, according to an illustrative embodiment.

With reference to FIGS. 3-5, the body 64 may include a first partition wall 68 which is positioned between the first cavity 50 and the second cavity 56, and in some embodiments may be substantially bisected by the longitudinal center axis 44 and/or by the transverse center axes 48a, 48b. The first cavity 50 can, in some aspects, be shaped and configured as a cradle. The second cavity 56 can, in some aspects, be shaped and configured so as to function as a passive sound amplifier.

As seen in FIGS. 3 and 4, the body 64 may also include a first wall 70 which is located forward of the first partition wall 68 and may include an access notch 72 which may be at least partially alignable with the actuation button 32 to facilitate actuation of the button when the device 12 is inserted into the first cavity 50. The access notch 72 may also allow viewing of the display 30 as well.

Figure 6:
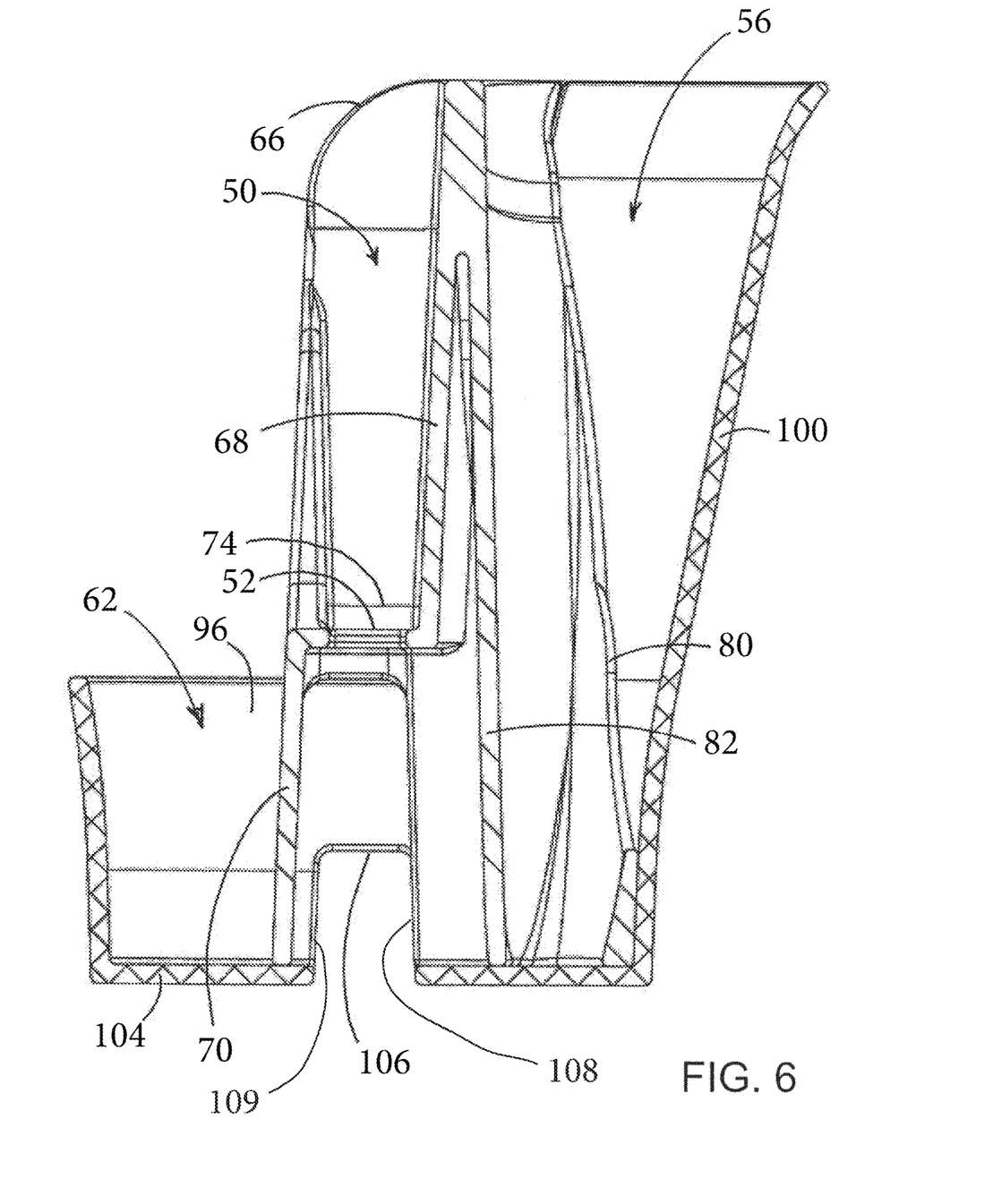
FIG. 6 is a schematic side sectional view of the holder taken along line 6-6 of FIG. 5, according to an illustrative embodiment.
Figure 7:
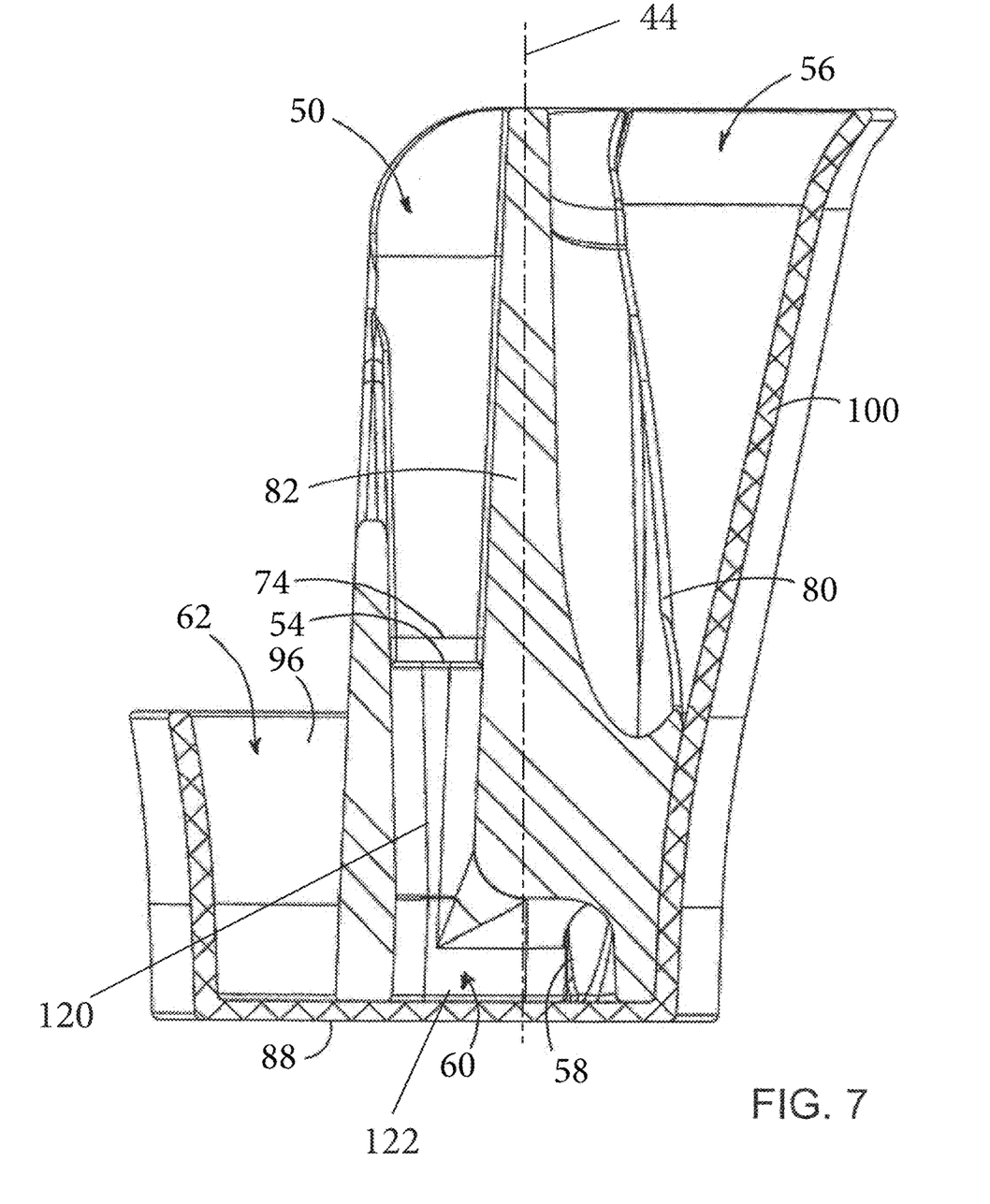
FIG. 7 is a schematic side sectional view of the holder taken along line 7-7 of FIG. 5, according to an illustrative embodiment.
Figure 8:
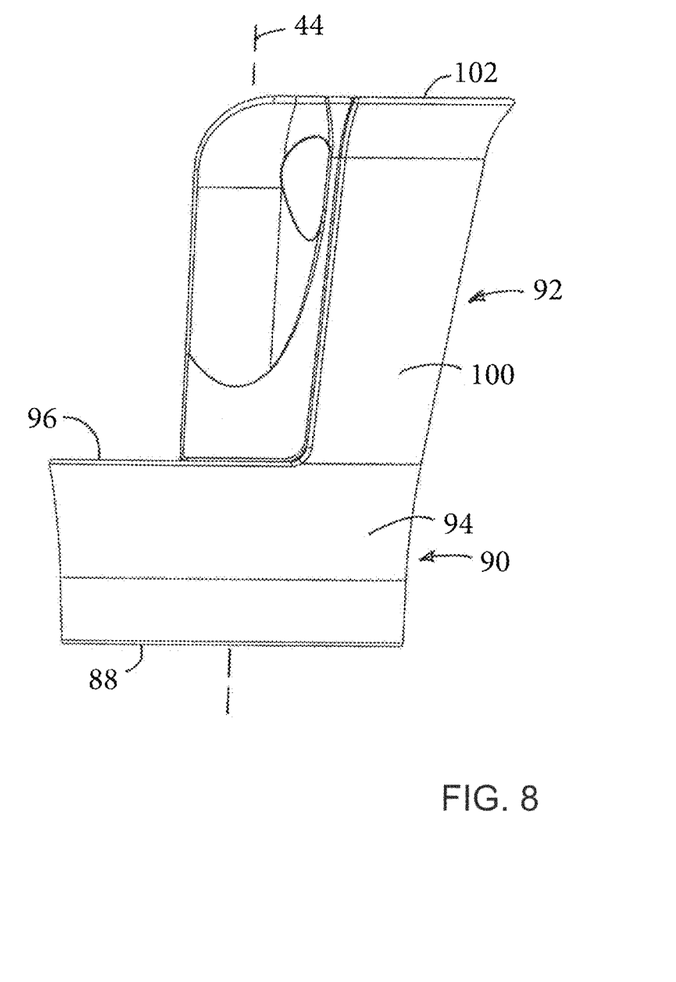
FIG. 8 is a schematic side view of the holder, according to an illustrative embodiment.

FIGS. 6 and 7 illustrate cross-sectional views of the holder 40 according to an embodiment. As seen therein, the body 64 may include a second wall 74 on which the electronic device 12 rests when the device 12 is inserted into the first cavity 50. The second wall 74 may extend between the first wall 70 and the first partition wall 68. The second wall 74 may include a cord passage 52 and an first sound channel 54 for the first cavity 50. A pair of side walls 76, 77 may also extend between the first wall 70 and the first partition wall 68, and the upper sections 78, 79 of the side walls may be flared outwardly from the first cavity 50.

Referring back to FIG. 5, a third wall 80 of the body 64 may form the forward extent of the second cavity 56, and may extend from the top 42 of the holder 40 to the lower end 21 of the third wall 80 toward the bottom 43. The body 64 may also have an intermediate wall 82 which is positioned rearwardly of the first wall 70 and forwardly of the third wall 80, and which may also extend from the top of the holder 40 to the lower end 21 of the intermediate wall 82 toward the bottom of the holder 40. The third wall 80 may abut the second partition wall on opposite sides. At least portions of the third wall 80 can be curved. In some embodiments, the second cavity 56 may be enclosed on the sides by the third wall 80.

As perhaps best illustrated in FIGS. 2 and 3, in certain aspects of the disclosure, the holder 40 may be at least a two-piece assembly wherein the body 64 can be received within an outer housing 86. In some such cases, the body 64 can be removably coupled to the housing 86. Alternatively, the body 64 may be integral to the outer housing 86. In some embodiments, the housing 86 may not be a part of the holder 40, but can be a user-provided housing, such as, for instance, an enclosure. In one embodiment, the outer housing 86 can be cup. Other shapes and sizes of the housing 86 are contemplated in the present disclosure.

In some such embodiments, as best seen in FIGS. 2 and 3, the housing 86 may form a portion of the second cavity 56 and may also form a bottom end 88 of the holder 40. The housing 86 may have a lower portion 90 and an upper portion 92, with the lower portion 90 having an outer surface 94 which may be substantially cylindrical in shape about the longitudinal center axis 44 of the holder 40 and extending from the bottom 43 upwardly toward the top 42 of the holder 40.

With continued reference to FIGS. 2 and 3, the housing 86 may include a lower perimeter edge 96 which forms the lower portion 90 of the housing 86, and may define an interior 98. The lower perimeter edge 96 may be substantially cylindrical about the longitudinal center axis 44. The housing 86 may also include a lateral edge 100 which forms a rearward extent of the second cavity 56. The lateral edge 100 may form the upper portion 92 of the housing 86, and may extend from the lower perimeter edge 96 toward an upper perimeter edge 102 of the housing 86 of the holder 40. The lateral edge 100 may be located rearwardly of the longitudinal center axis 44, and may extend along an arc centered on the longitudinal center axis 44. The housing 86 may also include a generally planar bottom surface 104 which is located on the lower portion 90. The generally planar bottom surface 104 may extend across a perimeter enclosed by the lower perimeter edge 96 at the bottom of the holder 40.

In optional embodiments best illustrated in FIG. 5, the outer housing 86 can have an interior surface 110. In some such embodiments, the interior surface 110 can be generally curved, permitting the holder 40 to amplify sound, as will be described further below. In exemplary embodiments, the outer housing 86, can have a frustoconical shape, to advantageously provide sound amplification. However, other shapes are also contemplated. In addition, as noted previously, the body 64 may be used without the outer housing 86 and still support for the device 12 while also having sound amplification capabilities.

As described previously and illustrated in the exemplary embodiment of FIG. 3, the body 64 portion may have a first wall 70, a second wall 74, a first partition wall 68, and a second partition wall. The first wall 70, the second wall 74, and the first partition wall 68 may define a first cavity 50 for receiving a portion of the electronic device 12. The second partition wall, third wall 80 and an interior surface 110 of the housing 86 may define a second cavity 56. The holder 40 may also define a tertiary cavity 62 which is located forwardly of the first cavity 50 and may be utilized for holding various other items.

In one embodiment, the first cavity 50 may have a generally rectangular shape. The first cavity 50 may be generally centered about the longitudinal center axis 44 and the transverse center axis 48a, b. In advantageous embodiment, the positioning of the first cavity close to the longitudinal center axis 44 and the transverse center axes 48a, 48b can improve stability of the holder 40. In some advantageous embodiments, when the device 12 is received in the first cavity 50, the holder 40 may not tip over, regardless of whether the body 64 is housed within the outer housing 86 (such as an enclosure, a cup or a cup holder). Accordingly, advantageous aspects of the present disclosure support the device 12 in a stable manner.

In some such embodiments, the first wall 70 and the first partition wall 68 may be generally parallel to each other. In some embodiments, each of the first wall 70, and the first partition wall 68 may also be generally perpendicular to the second wall 74. Further, the first partition wall 68 and the second partition wall may be oppositely oriented. In some optional embodiments, the second wall 74 may be generally perpendicular to the longitudinal center axis 44 and may be offset from the generally planar bottom surface 104 of the outer housing 86.

The first cavity 50 can receive the electronic device 12 in some embodiments. The first cavity 50 may be shaped and sized to receive at least a portion of the case 14 of the electronic device 12, and the portion may be sufficient to substantially immobilize the device 12 with respect to the holder 40 until physically grasped and removed from the holder 40 by the user.

Referring again to FIG. 5, a cord passage 52 may be formed on the holder 40 and may be in communication with the first cavity 50 in a location which is configured to align with the electrical connection interface 28 of the device 12 when the device 12 is positioned in the first cavity 50

The device holder 40 may also define a second cavity 56 which is configured to direct or guide sound emanating from the electronic device 12 positioned in the first cavity 50, and may, optionally, serve to provide a degree of amplification of the sound as the sound waves pass through the second cavity 56 as will be described further below. The amplification of the sound may be accomplished substantially passively as will be described further below. Accordingly, exemplary embodiments of the device holder 40 may not draw any power in order to amplify sound.

In some embodiments best illustrated in FIGS. 5 and 6, the second cavity 56 can have a generally frustoconical shape, such that a cross-sectional area of the second cavity 56 increases along a direction parallel to the longitudinal center axis 44. Such embodiments may permit the holder 40 to passively amplify sound generated by the electronic device 12.

Figure 10:
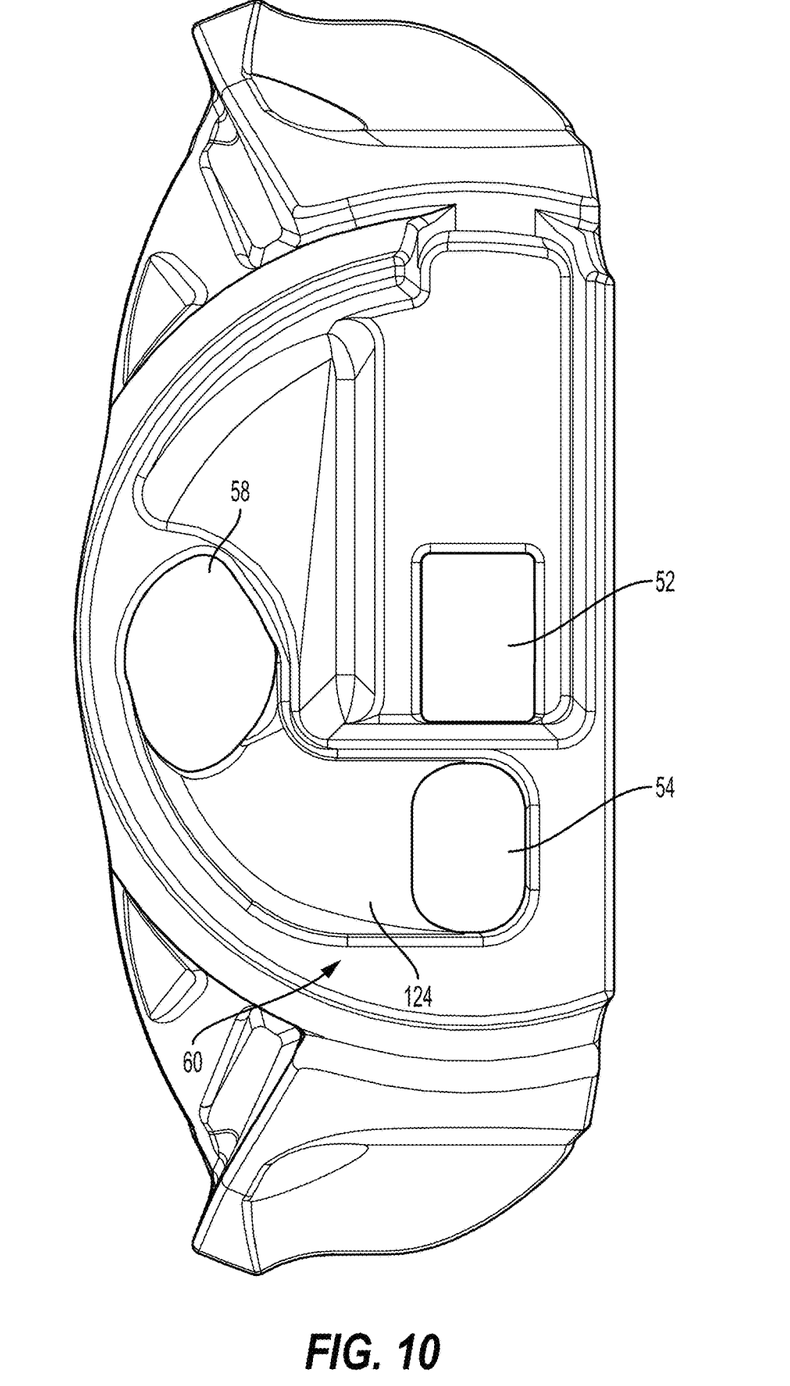
FIG. 10 is a schematic showing a bottom view of the device holder of FIG. 1 shown without the electronic device.

In illustrative embodiments best seen in FIGS. 7 and 10, the holder 40 may also include a sound transmitting passage 60 in communication with the first cavity 50 and the second cavity 56. The sound transmitting passage 60 can, in some aspects, function as a sound channel. The sound transmitting passage 60 can be in communication with the first cavity 50 and the second cavity 56 such that sound generated by the speakers enter the sound transmitting passage 60, and is conveyed (as pressurized air waves) by the sound transmitting passage 60 into the second cavity 56.

The sound transmitting passage 60 can be generally centered with respect to the longitudinal centerline 44 and the transverse center axes 48a, 48b, so as to maximize sound amplification capabilities. The sound transmitting passage 60 may extend from the first sound channel 54 of the first cavity 50 to an second sound channel 58. As illustrated, in some embodiments, the sound transmitting passage 60 extends between the second wall 74 and the second cavity 56. The second sound channel 58 of the sound transmitting passage 60 can also be an inlet of the second cavity 56 to facilitate the communication of sound from the first cavity 50 to the second cavity 56.

In advantageous embodiments, the first sound channel 54 may also be formed on the holder 40 and may be in communication with the first cavity 50 in a location which is configured to align with the sound emanation structure 26 of the device 12 when the device 12 is inserted into the first cavity 50.

As seen in at least FIGS. 7 and 10, the sound transmitting passage 60 has a first portion 120 oriented in a direction generally parallel to the longitudinal center axis 44, and a second portion 122 extending in a direction perpendicular to the longitudinal center axis 44. The second portion 122 is formed by at least one curved surface. The sound transmitting passage 60 also has a channel 124 that is angled (e.g., curved) so as to connect the first portion 120 and the second portion 122. In optional embodiments, the channel 124 may additionally be contoured so as to be non-parallel to the generally planar bottom surface 104. The sound transmitting passage 60 as illustrated in FIG. 7 has a generally L-shape when viewed in the direction of FIG. 7, and a generally C-shape when viewed in the direction illustrated in FIG. 10. Advantageously, the first sound channel 54, and the second sound channel 58 may both be generally close to the longitudinal and/or transverse center axes 44, 48a, 48b. The curvature of the sound transmitting passage 60 and the positioning of the first sound channel 54 and the second sound channel 58 can provide optimal sound amplification in a passive manner.

As best seen in FIG. 7, the sound transmitting passage 60 may have a generally uniform cross-sectional area in some optional embodiments. For instance, a cross-sectional area of the sound amplification passage (e.g., as seen in FIG. 7) may be generally constant between the first sound channel 54 and the second sound channel 58. Alternatively, the sound transmitting passage 60 may have a variable cross-section.

As a further option, an electrically powered speaker may be incorporated into the holder 40, and for example may be positioned toward the lower end 21 of the second cavity 56 and oriented to send sound into the second cavity 56 to amplify sound produced by the electronic device 12. The speaker may be powered by an amplifier that receive signals either directly from the device 12 through the electrical connection interface 28, or a microphone positioned at or adjacent to the first sound channel 54 to receive sound waves from the sound emanation structure 26 of the device 12.

Referring back to FIG. 6, a second slot 106 may extend through the generally planar bottom surface 104, and may extend from one side portion 108 of the lower wall to another side portion 109 of the lower wall. The second slot 106 may extend into at least one of the side portions 108, 109 of the lower wall. The second slot 106 may be in communication with the cord passage 52 of the first cavity 50 to permit a cord to pass through the cord passage 52 from the device 12 to a location exterior of the holder 40. The lower end 21 of the rear wall of the body 64 may abut against the generally planar bottom surface 104 when the body 64 and housing 86 are assembled together. The lower end 21 of the intermediate wall 82 of the body 64 may also abut against the bottom wall.

It should be recognized that the location of the first sound channel 54 on the holder 40 may be varied to correspond to the position of the speakers 26 on various electronic devices 12 which may not necessarily be on the peripheral edge surface 18. For example, the first sound channel 54 may be located on one of the partition walls to align with a speakers 26 located on the rear surface 17 of the case 14, such as near the lower end 21 of the case 14.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

Various examples have been described. These and other examples are within the scope of the following claims.

The invention claimed is:

1. An electronic device holder for holding an electronic device, the electronic device comprising one or more speakers for transmitting sound generated by the electronic device, the electronic device holder being housed within an outer housing and/or resting on a support surface, the electronic device holder comprising:
   a body portion having a first wall, a second wall, a third wall, a first partition wall and a second partition wall, each of the first wall, the first partition wall, and the second partition wall being generally perpendicular to the support surface, the second wall being generally parallel to the support surface and positioned between the first wall and the first partition wall so as to define a first cavity, the third wall abutting the second partition wall at a first side and a second side, the first side being opposite to the second side, the third wall having a third wall bottom portion at a common elevation with the second wall, the third wall extending from the third wall bottom portion toward a third wall top portion at an angle non-parallel to a longitudinal center axis of the electronic device holder,
   a second cavity defined between the second partition wall, the third wall, and the outer housing, and
   a sound transmitting passage in communication with the first cavity, the sound transmitting passage having a first sound channel and a second sound channel,
   the first cavity configured to receive the electronic device such that the one or more speakers of the electronic device are aligned with the sound transmitting passage, such that sound emitted by the electronic device is conveyed and/or amplified via the sound transmitting passage.

2. The electronic device holder of claim 1, wherein the longitudinal center axis being generally perpendicular to the second wall.

3. The electronic device holder of claim 2, wherein the sound transmitting passage has a first portion oriented in a direction generally parallel to the longitudinal center axis, and a second portion extending in a direction perpendicular to the longitudinal center axis.

4. The electronic device holder of claim 3, wherein the second portion is formed by at least one curved surface.

5. The electronic device holder of claim 4, wherein the first sound channel is located such that when the electronic device is held in the first cavity, the first sound channel is inline with at least one of the one or more speakers of the electronic device.

6. The electronic device of claim 1, wherein the body portion is removably coupled to the outer housing.

7. The electronic device of claim 1, wherein the second wall has a cord passage configured to align with an electrical connection interface of the electronic device when the electronic device is received in the first cavity.

8. The electronic device of claim 7, wherein the electronic device holder has a generally planar bottom surface having a second slot at least partially in line with the cord passage of the second wall, the second slot permitting passage of an electrical connector therethrough to be connected to the electrical connection interface of the electronic device, thereby permitting electrical connection to the electronic device when the electronic device is housed within the first cavity.

9. The electronic device of claim 1, wherein the first wall includes a cutout terminating in an access notch, the access notch being located such that when the electronic device is received in the first cavity, the access notch is aligned with an actuation button of the electronic device.

10. An electronic device holder for holding an electronic device, the electronic device comprising one or more speakers for transmitting sound generated by the electronic device, the electronic device holder comprising:
   an outer housing having a generally planar bottom surface, the generally planar bottom surface configured to rest on a support surface, the outer housing having a lower portion, an upper portion, and a curved interior surface, the upper portion extending less than three hundred and sixty degrees around a lower perimeter edge of the lower portion; and
   a body portion housed within the outer housing, the body portion having a first wall, a second wall, a first partition wall and a second partition wall,
   the first partition wall and the second partition wall being opposite to each other,
   the second partition wall being generally perpendicular to a longitudinal center axis of the electronic device holder,
   the first wall, the first partition wall, and the second wall defining a first cavity for receiving the electronic device,
   the second partition wall and the curved interior surface defining a second cavity,
   the second cavity having a first sound channel and a second sound channel, the first sound channel of the second cavity being in communication with the first cavity via a sound transmitting passage, the first sound channel of the second cavity being proximal to the generally planar bottom surface, the second sound channel of the second cavity being oppositely oriented to the first sound channel, a cross-sectional area of the second cavity increasing along a direction parallel to the longitudinal center axis to passively amplify sound generated by the electronic device.

11. The electronic device holder of claim 10, wherein the body portion comprises a third wall, the third wall abutting the second partition wall at a first side and a second side, the first side being opposite to the second side.

12. The electronic device holder of claim 11, wherein the third wall is curved at least proximal to the first side and the second side.

13. The electronic device holder of claim 12, wherein the third wall includes a cutout portion, whereby the second cavity is enclosed by the second partition wall, the third wall and the curved interior surface.

14. The electronic device holder of claim 13, wherein the second cavity has a generally frustoconical shape.

15. The electronic device holder of claim 10, wherein the first cavity has a generally constant cross-sectional area along the longitudinal center axis.

16. The electronic device holder of claim 15, wherein the first cavity has a generally rectangular cross-section.

17. An electronic device holder for holding an electronic device, the electronic device comprising one or more speakers for transmitting sound generated by the electronic device, the electronic device holder being housed within an outer housing and/or resting on a support surface, the electronic device holder comprising:
  a body portion housed within the outer housing, the body portion having a first wall, a second wall, a first partition wall and a second partition wall,
  the first wall, the second wall and the first partition wall defining a first cavity configured to receive the electronic device
  the second partition wall and an interior surface of the outer housing defining a second cavity,
  a sound transmitting passage positioned between the first cavity and the second cavity, the sound transmitting passage having a generally uniform cross-sectional area where the sound transmitting passage extends perpendicular to a longitudinal center axis of the electronic device holder, the sound transmitting passage having:
    a first sound channel positioned on the second wall, whereby, when the electronic device is positioned in the first cavity, at least one of the one or more speakers of the electronic device being aligned with the sound transmitting passage,
    a second sound channel positioned on the second partition wall, such that sound from the one or more speakers of the electronic device is conveyed via the second sound channel to the second cavity, and
    a curved channel connecting the first sound channel and the second sound channel and positioned therebetween,
  the second cavity configured to passively amplify sound received from the second sound channel of the sound transmitting passage.

18. The electronic device holder of claim 17, wherein the sound transmitting passage has a first portion oriented in a direction generally parallel to the longitudinal center axis of the electronic device holder, the first portion terminating in the first sound channel and extending between the second wall and the curved channel.

19. The electronic device holder of claim 18, wherein the sound transmitting passage has a second portion extending in a direction perpendicular to the longitudinal center axis, the second portion terminating in the second sound channel and extending between the curved channel and the second cavity.

20. The electronic device holder of claim 18, wherein the sound transmitting passage is generally centered so as to be proximal to the longitudinal center axis and/or a transverse center axis of the electronic device holder, the transverse center axis being generally perpendicular to the longitudinal center axis.

* * * * *